(12) United States Patent
Dine (10) Patent No.: US 11,053,984 B2
(45) Date of Patent: Jul. 6, 2021

(54) BOOT AND RETENTION MEMBER ASSEMBLY FOR A CONSTANT VELOCITY JOINT

(71) Applicant: DANA AUTOMOTIVE SYSTEMS GROUP, LLC, Maumee, OH (US)

(72) Inventor: Donald W. Dine, Whitehouse, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 384 days.

(21) Appl. No.: 16/091,814

(22) PCT Filed: Apr. 6, 2017

(86) PCT No.: PCT/US2017/026347
§ 371 (c)(1),
(2) Date: Oct. 5, 2018

(87) PCT Pub. No.: WO2017/176994
PCT Pub. Date: Oct. 12, 2017

(65) Prior Publication Data
US 2019/0101166 A1 Apr. 4, 2019

Related U.S. Application Data

(60) Provisional application No. 62/318,925, filed on Apr. 6, 2016.

(51) Int. Cl.
*F16D 3/223* (2011.01)
*F16D 3/84* (2006.01)
*F16D 3/205* (2006.01)

(52) U.S. Cl.
CPC ............ *F16D 3/223* (2013.01); *F16D 3/205* (2013.01); *F16D 3/84* (2013.01); *F16D 3/845* (2013.01);
(Continued)

(58) Field of Classification Search
CPC . F16D 3/223; F16D 3/84; F16D 3/205; F16D 3/845; F16D 2003/22316;
(Continued)

(56) References Cited

U.S. PATENT DOCUMENTS 2,473,618 A * 6/1949 Stillwagon, Jr. ......... F16J 3/047
464/175
3,399,584 A * 9/1968 Lewicki ................. F16M 11/40
464/174
(Continued)

FOREIGN PATENT DOCUMENTS

EP 0440890 8/1991
FR 2351310 12/1977
(Continued)

OTHER PUBLICATIONS

European Patent Office, International Search Report with Written Opinion issued in PCT/US2017/026347, dated Jun. 20, 2017, 10 pages, European Patent Office, Rijswijk, Netherlands.

*Primary Examiner* — Greg Binda
(74) *Attorney, Agent, or Firm* — Marshall & Melhorn, LLC (57) ABSTRACT

A constant velocity joint and flexible boot assembly. The constant velocity joint includes an outer race having a first end portion and a second end portion. The first end portion of the outer race is connected to a first shaft. A second end portion of a flexible boot includes an attachment portion having a groove circumferentially extending along at least a portion of an outer surface of the attachment portion. The attachment portion of the flexible boot is connected to an outer surface of a second shaft. A retaining member has a first and second boot retention leg extending radially inward from at least a portion of an inner surface of the retaining member. At least a portion of the first leg is disposed within
(Continued)

the groove and at least a portion of the second leg is disposed axially outboard from a second end of the flexible boot.

14 Claims, 8 Drawing Sheets

(52) U.S. Cl.
CPC . *F16D 2003/22316* (2013.01); *Y10S 464/905* (2013.01); *Y10S 464/906* (2013.01)

(58) Field of Classification Search
CPC ............. F16D 3/22; F16D 2003/22309; Y10S 464/905; Y10S 464/906
USPC .................... 464/173–175; 277/641; 24/20 R
See application file for complete search history.

(56) References Cited

U.S. PATENT DOCUMENTS

| | | | | |
|---|---|---|---|---|
| 3,914,852 | A | * | 10/1975 | Fisher ..................... F16D 3/845 |
| 4,132,422 | A | * | 1/1979 | Sankey .................... F16J 15/52 |
| | | | | 277/641 |
| 4,580,921 | A | * | 4/1986 | Broszat ............... F16C 11/0671 |
| | | | | 277/641 |
| 4,852,891 | A | | 8/1989 | Sugiura |
| 5,078,652 | A | | 1/1992 | Baker |
| 5,975,767 | A | | 11/1999 | Mizukoshi |
| 6,921,091 | B2 | | 7/2005 | Neviani |
| 8,425,142 | B2 | | 4/2013 | Disser |

FOREIGN PATENT DOCUMENTS

| | | | | |
|---|---|---|---|---|
| JP | H05180350 | | 7/1993 | |
| SE | 119 122 | * | 6/1947 | .................... 464/173 |

* cited by examiner

BOOT AND RETENTION MEMBER ASSEMBLY FOR A CONSTANT VELOCITY JOINT

CROSS REFERENCE TO RELATED APPLICATIONS

The present application is the National Stage of International Application No. PCT/US2017/026347, filed Apr. 6, 2017, which claims the benefit of U.S. Provisional patent Application No. 62/318,925 filed on Apr. 6, 2016, which is incorporated herein by reference in its entirety.

FIELD OF THE DISCLOSURE

The present disclosure relates to a flexible boot and retention member assembly for a constant velocity joint.

BACKGROUND OF THE DISCLOSURE

Constant velocity joints are widely used in motor vehicles. A conventional constant velocity joint assembly includes a joint having a cylindrical inner race, which connects to a tube shaft that connects to a driveshaft, and an outer race, which connects to a companion flange on an axle. A flexible boot is used to cover one end of the constant velocity joint assembly to keep dirt, debris and moisture from entering into the joint while at the same time keeping lubricant within the joint.

The flexible boots can be made from flexible materials including elastomeric or plastic materials. One known flexible boot structure includes a larger diameter end secured to the outer race of the constant velocity joint and a smaller diameter end secured to the shaft extending from the inner race. A boot can or retainer, formed of a more rigid material than the flexible boot, can be used to protect the flexible boot.

Figure 1:
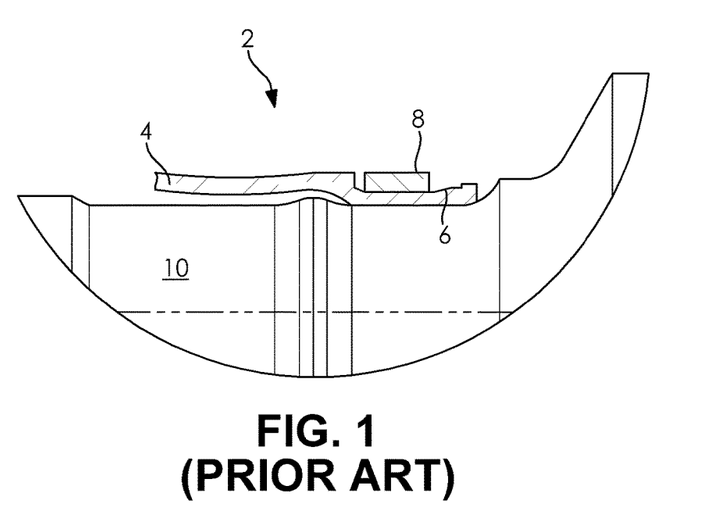
FIG. 1 is a schematic side-view of a portion of a prior art constant velocity joint assembly illustrating the axial extrusion of the material of a flexible boot when a force is applied by a boot clamp.

There are several known methods for securing the ends of the flexible boot to the outer race and tube shaft. Typically, the smaller diameter end of the flexible boot is secured to the tube shaft using a retaining member such as a boot clamp. The boot clamp fits around the flexible boot when the flexible boot is positioned over the tube shaft. FIG. 1 of the disclosure, schematically illustrates a portion of a constant velocity joint assembly 2 having a known flexible boot design 4 having a groove 6 with a boot clamp 8 disposed therein.

When the boot clamp 8 is positioned within the groove 6 of the flexible boot 4, the boot clamp 8 is tightened. Due to a force exerted by the boot clamp 8 and the shape of the boot clamp 8, it is possible for material of the flexible boot 4 to extrude axially out from under the boot clamp 8 when the boot clamp 8 is tightened. This axial extrusion of the flexible boot material reduces the radial compression force exerted by the boot clamp 8 and reduces the amount of friction between the flexible boot 4 and the tube shaft 10. Additionally, when the constant velocity joint assembly 2 is exposed to lower temperatures, the material of the flexible boot contracts and hardens further reducing the amount of friction between the flexible boot 4 and the tube shaft 10. As a result, the flexible boot 4 tends to slip and twist around the tube shaft 10 reducing the overall performance of the flexible boot 4 at low temperatures.

It would therefore be advantageous to develop a flexible boot and retaining member assembly that will increase the overall clamping force of the retaining member and increase the overall durability of the connection. Additionally, it would be advantageous to develop a flexible boot and retaining member assembly that will increase the overall performance of the retaining member at lower temperatures.

SUMMARY OF THE DISCLOSURE

The present disclosure relates to a flexible boot assembly for a constant velocity joint. The constant velocity joint assembly has an outer race having a first end portion and a second end portion. At least a portion of the first end portion of the outer race is connected to a first shaft.

The flexible boot assembly includes a flexible boot having a first end portion and a second end portion. The second end portion of the flexible boot includes an attachment portion that is connected to an outer surface of a second shaft. Circumferentially extending along at least a portion of an outer surface of the attachment portion of the second end portion of the flexible boot is a groove.

Disposed at least partially radially outboard from the attachment portion of the second end portion of the flexible boot is a retaining member having an inner surface and an outer surface. Extending radially inboard from at least a portion of the inner surface of the retaining member is a first and a second boot retention leg. At least a portion of the first boot retention leg is disposed within the groove in the outer surface of the attachment portion of the second end portion of the flexible boot. Additionally, at least a portion of the second boot retention leg is then disposed axially outboard from a second end of the flexible boot and the groove in the attachment portion of the second end portion of the flexible boot.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the flexible boot and retaining member assembly disclosed herein may be used in automotive, off-road vehicle, all-terrain vehicle, construction, structural, marine, aerospace, locomotive, military, machinery, robotic and/or consumer product applications. Additionally, as a non-limiting example, the flexible boot and retaining member assembly disclosed herein may also be used in passenger vehicle, electric vehicle, hybrid vehicle, commercial vehicle, autonomous vehicles, semi-autonomous vehicles and/or heavy vehicle applications.

Figure 2:
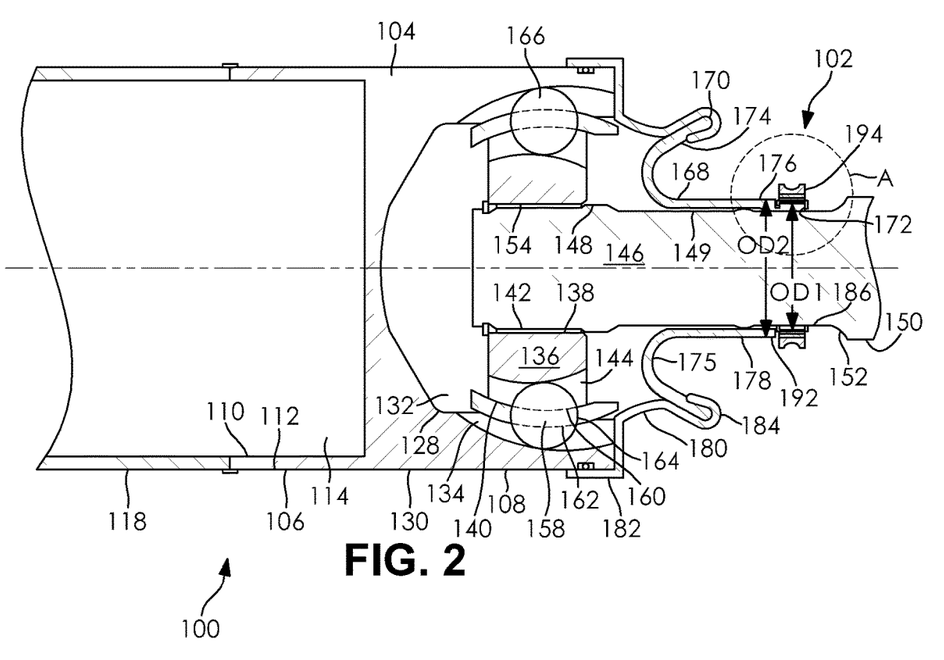
FIG. 2 is a schematic side-view of a constant velocity joint assembly having a flexible boot and retaining member assembly according to an embodiment of the disclosure.
Figure 2A:
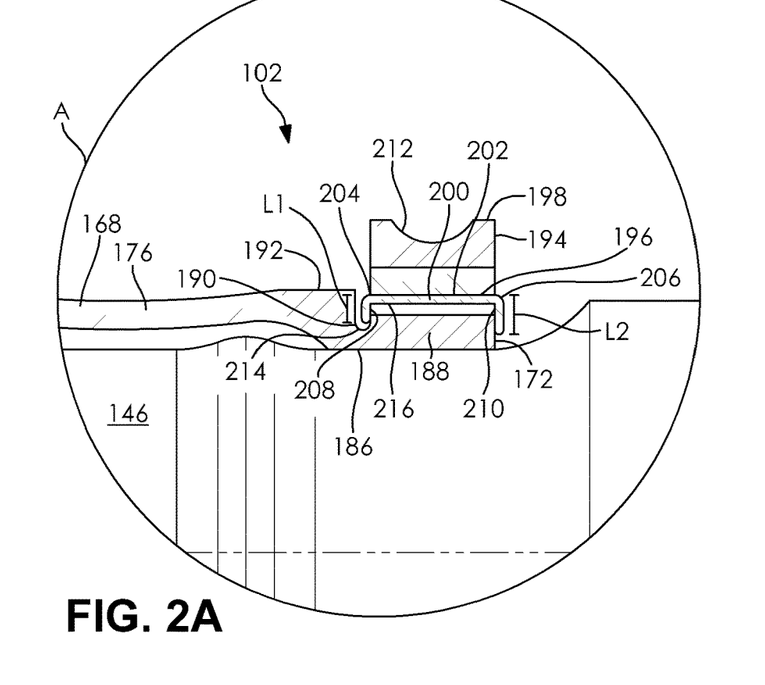
FIG. 2A is a schematic detailed-view of a portion of the flexible boot and retaining member assembly illustrated in FIG. 2.
Figure 2B:
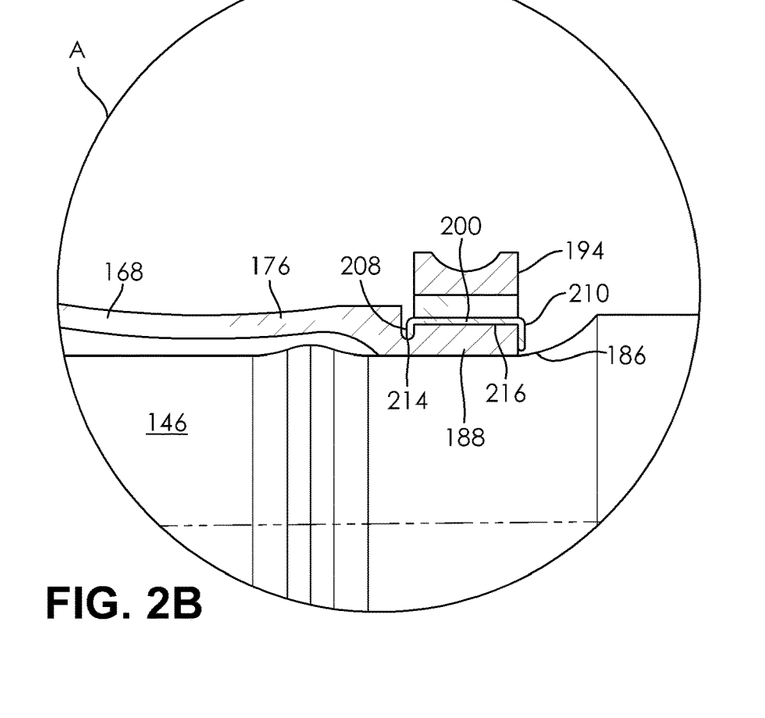
FIG. 2B is a schematic detailed-view of a portion of the flexible boot and retaining member assembly illustrated in FIG. 2 according to an embodiment of the disclosure when the retaining member is tightened around the flexible boot.
Figure 2C:
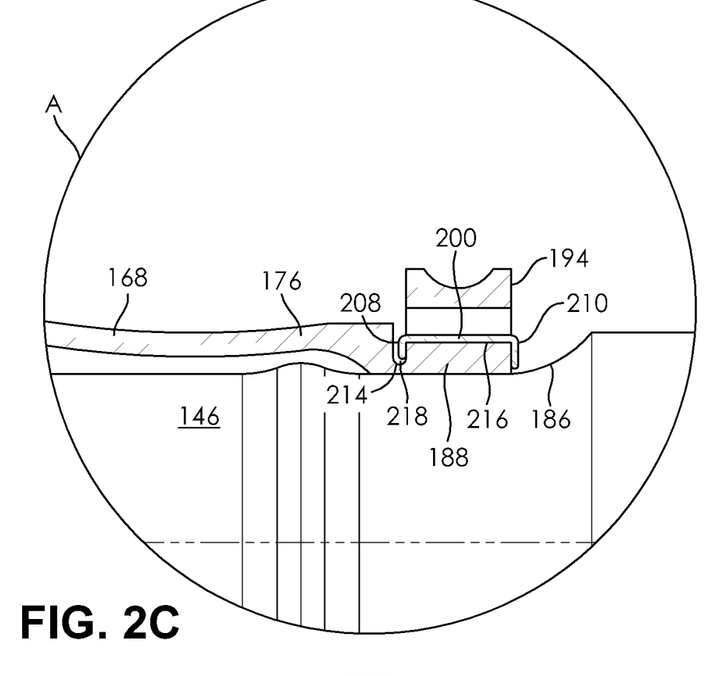
FIG. 2C is a schematic detailed-view of a portion of the flexible boot and retaining member assembly illustrated in FIG. 2 according to an alternative embodiment of the disclosure when the retaining member is tightened around the flexible boot.
Figure 2D:
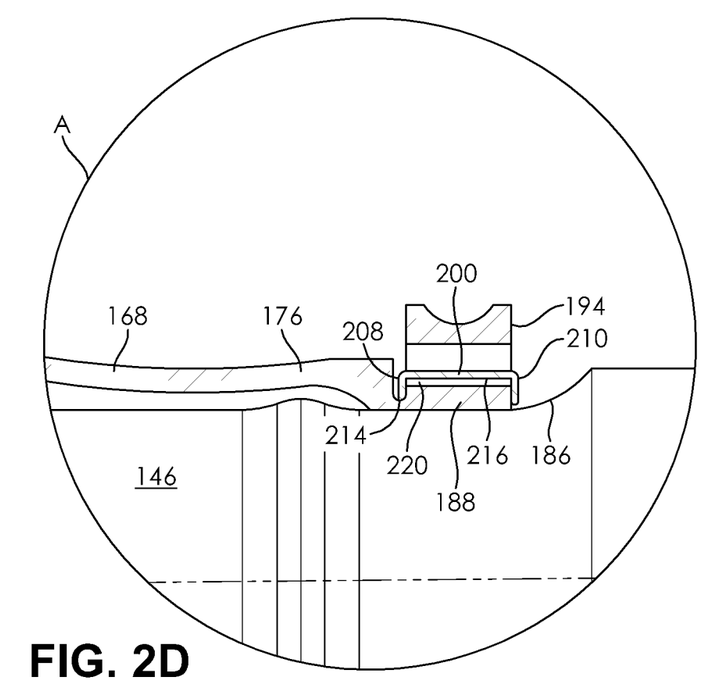
FIG. 2D is a schematic detailed-view of a portion of the flexible boot and retaining member assembly illustrated in FIG. 2 according to another embodiment of the disclosure when the retaining member is tightened around the flexible boot.

FIGS. 2-2D are a schematic side-view of a portion of a constant velocity joint assembly 100 having a flexible boot and retaining member assembly 102 according to an embodiment of the disclosure. According to the embodiment of the disclosure illustrated in FIGS. 2-2D, the constant velocity joint assembly 100 is a fixed sliding ball type constant velocity joint with articulation but not plunging capabilities. It is within the scope of this disclosure that the flexible boot and retaining member assembly 102 may be used in connection with any type of constant velocity joint having plunging and/or articulation capabilities. As a non-limiting example, the flexible boot and retaining member assembly 102 may be used in connection with a direct pinion mount constant velocity joint, a fixed direct pinion mount sliding ball type constant velocity joint, a plunging cross groove sliding ball type constant velocity joint, a direct pinion mount plunging cross groove sliding ball type constant velocity joint, a double offset plunging constant velocity joint, a direct pinion mount double offset plunging constant velocity joint, a tripod type constant velocity joint or a direct pinion mount tripod type constant velocity joint.

As illustrated in FIG. 2 of the disclosure, the constant velocity joint assembly 100 has an outer race 104 having a first end portion 106 and a second end portion 108. The first end portion 106 of the outer race 104 have an inner surface 110 and an outer surface 112 defining a hollow portion 114 therein. At least a portion of the first end portion 106 of the outer race 104 is connected to an end of a first shaft 118 that extends co-axially with the first end portion 106 of the outer race 104. According to the embodiment of the disclosure illustrated in FIG. 2 and as a non-limiting example, at least a portion of the first end portion 106 of the outer race 104 is integrally connected to at least a portion of the end of the first shaft 118 by using one or more welds. In accordance with an alternative embodiment of the disclosure (not shown), at least a portion of the first end portion of the outer race is drivingly connected to at least a portion of the end of the shaft by using a threaded connection, a splined connection and/or one or more mechanical fasteners. As a non-limiting example, the first shaft 118 is a propeller shaft, a drive shaft, a cardan shaft, a double cardan shaft, a universal joint shaft, a universal coupling shaft or a Hooke's joint shaft.

The second end portion 108 of the outer race 104 has an inner surface 128 and an outer surface 130 defining a hollow portion 132 therein. Circumferentially extending along at least a portion of the inner surface 128 of the second end portion 108 of the outer race 104 is one or more outer race torque transfer element grooves 134.

Disposed radially inward from the inner surface 128 of the second end portion 108 of the outer race 104 is an inner race 136 having an inner surface 138 and an outer surface 140. Circumferentially extending along at least a portion of the inner surface 138 of the inner race 136 is a plurality of axially extending inner race splines 142.

As illustrated in FIG. 2 of the disclosure, circumferentially extending from at least a portion of the outer surface 140 of the inner race 136 of the constant velocity joint assembly 100 is one or more inner race torque transfer element grooves 144. The one or more inner race torque transfer element grooves 144 are complementary to the one or more outer race torque transfer element grooves 134 on the inner surface 128 of the outer race 104.

Drivingly connected to the inner race 136 is a second shaft 146 having a first end portion 148, an intermediate portion 149, a second end portion 150 and an outer surface 152. The second shaft 146 extends co-axially with the inner race 136 of the constant velocity joint assembly 100. Circumferentially extending along at least a portion of the outer surface 152 of the first end portion 148 of the second shaft 146 is a plurality of axially extending second shaft splines 154. The plurality of axially extending second shaft splines 154 are complementary to and meshingly engaged with the plurality of axially extending inner race splines 142 on the inner surface 138 of the inner race 136. As a non-limiting example, the second shaft 146 is a pinion gear shaft, a differential input shaft, a differential pinion gear shaft, a front axle input shaft, a front axle differential pinion gear shaft, a forward tandem axle input shaft, a forward tandem axle differential output shaft, a rear tandem axle input shaft, a rear tandem axle differential pinion gear shaft, an inter-axle differential pinion gear shaft or a shaft connected to another shaft adjacent to a center bearing.

According to an alternative embodiment of the disclosure, the second shaft 146 may be a stub shaft. In accordance with this embodiment of the disclosure, an end of the stub shaft opposite the inner race is drivingly connected to a pinion gear shaft, a differential input shaft, a differential pinion gear shaft, a front axle input shaft, a front axle differential pinion gear shaft, a forward tandem axle input shaft, a forward tandem axle differential output shaft, a rear tandem axle input shaft, a rear tandem axle differential pinion gear shaft, an inter-axle differential pinion gear shaft or a shaft connected to another shaft adjacent to a center bearing.

Interposed between the inner race 136 and the second end portion 108 of the outer race 104 is a cage 158 having an inner surface 160 and an outer surface 162. Extending from the inner surface 160 to the outer surface 162 of the cage 158 is one or more torque transfer element retaining openings 164.

Drivingly connecting the inner race 136 to the second end portion 108 of the outer race 104 is one or more torque transfer elements 166. As illustrated in FIG. 2 of the disclosure, at least a portion of the one or more torque transfer elements 166 are disposed within the one or more outer race torque transfer element grooves 134, the one or more inner race torque transfer element grooves 144 and the one or more torque transfer element retaining openings 164. As a non-limiting example, the one or more torque transfer elements 166 are one or more ball bearings.

Disposed radially outboard from the second shaft 146 is a flexible boot 168 having a first end 170, a second end 172, first end portion 174, an intermediate portion 175, a second end portion 176 and an outer surface 178. The flexible boot 168 provides a flexible seal for the constant velocity joint assembly 100 preventing the migration of dust, debris and moisture from the external environment into the constant velocity joint assembly 100. As a non-limiting example, the flexible boot 168 is made of a polymeric material, a rubber material, an elastomeric material, a thermoplastic material or a combination thereof.

The first end portion 174 of the flexible boot 168 is connected to the outer surface 130 of the second end portion 108 of the outer race 104 by using a boot can 180 having a first end portion 182 and a second end portion 184. As illustrated in FIG. 2 of the disclosure, at least a portion of the first end portion 182 of the boot can 180 is attached to the outer surface 130 of the second end portion 108 of the outer race 104 of the constant velocity joint assembly 100. Additionally, as illustrated in FIG. 2 of the disclosure, at least a portion of the second end portion 184 of the boot can 180 is attached to at least a portion of the first end portion 174 of the flexible boot 168 of the constant velocity joint assembly 100. As a non-limiting example, the boot can 180 is made of a substantially rigid material such as a metallic material, an aluminum alloy, a steel alloy, a carbon fibre material or a composite material.

At least a portion of the second end portion 176 of the flexible boot 168 is attached to the outer surface 152 of the second shaft 146. According to the embodiment of the disclosure illustrated in FIGS. 2-2D and as a non-limiting example, the second end portion 176 of the flexible boot 168 is attached to at least a portion of the outer surface 152 of an annular attachment groove 186 in the intermediate portion 149 of the second shaft 146.

As illustrated in FIGS. 2-2D of the disclosure, the second end portion 176 of the flexible boot 168 has a substantially cylindrical attachment portion 188. Circumferentially extending along at least a portion of the outer surface 178 of the substantially cylindrical attachment portion 188 is a groove 190 having a shoulder portion 192. The groove 190 extends radially inward from the outer surface 178 of the substantially cylindrical attachment portion 188 of the flexible boot 168 of the constant velocity joint assembly 100. In accordance with the embodiment of the disclosure illustrated in FIGS. 2-2D and as a non-limiting example, the substantially cylindrical attachment portion 188 of the flexible boot 168 has an outer diameter OD1 that is smaller than an outer diameter OD2 of the shoulder portion 192 of the flexible boot 168.

Disposed at least partially radially outboard from the substantially cylindrical attachment portion 188 of the flexible boot 168 is a retaining member 194 having an inner surface 196 and an outer surface 198. When tightened, the retaining member 194 applies a compressive force or a clamping force onto the substantially cylindrical attachment portion 188 of the flexible boot 168. The compressive force or clamping force of the retaining member 194 provides a sealing engagement between at least a portion of the substantially cylindrical attachment portion 188 of the flexible boot 168 and at least a portion of the outer surface 152 of the second shaft 146.

Extending radially inward from at least a portion of the inner surface 196 of the retaining member 194 is a boot retention portion 200 of the retaining member 194. As illustrated in FIGS. 2-2D, the boot retention portion 200 of the retaining member 194 has substantially cylindrical body portion 202 having a first end 204 and a second end 206. According to an embodiment of the disclosure, the boot retention portion 200 of the retaining member 194 is integrally formed as part of the retaining member 194. In accordance with an alternative embodiment of the disclosure, the boot retention portion 200 of the retaining member 194 is not integrally formed as part of the retaining member 194. As a non-limiting example, at least a portion of the substantially cylindrical body portion 202 of the boot retention portion 200 is integrally connected to at least a portion of the inner surface 196 of the retaining member 194 by using one or more welds, one or more adhesive, a threaded connection and/or one or more mechanical fasteners.

Extending radially inward from the first end 204 of the substantially cylindrical body portion 202 of the boot retention portion 200 of the retaining member 194 is a first boot retention leg 208. A second boot retention leg 210 extends radially inward from the second end 206 of the boot retention portion 200 of the retaining member 194. As illustrated in FIGS. 2-2D and as a non-limiting example, the substantially cylindrical body portion 202, the first boot retention leg 208 and the second boot retention leg 210 forms a substantially U-shaped cross section. According to an embodiment of the disclosure and as a non-limiting example, the first boot retention leg 208 has a length L1 that is smaller than a length L2 of the second boot retention leg 210 of the boot retention portion 200 of the retaining member 194.

In accordance with an alternative embodiment of the disclosure (not shown), the retaining member 194 circumferentially extends radially outboard from at least a portion of the substantially cylindrical body portion 202 of the boot retention portion 200. As a result, the retaining member 194 only extends partially around the substantially cylindrical body portion 202 of the boot retention portion 200.

As illustrated in FIGS. 2-2D of the disclosure, at least a portion of the first boot retention leg 208 is disposed within the groove 190 in the outer surface 178 of the substantially cylindrical attachment portion 188 of the flexible boot 168. Additionally, as illustrated in FIGS. 2-2D of the disclosure, the second boot retention leg 210 is disposed directly adjacent to and axially outboard from the second end 172 of the flexible boot 168. At least a portion of the second boot retention leg 210 is in direct contact with the second end 172 of the flexible boot 168 of the constant velocity joint assembly 100.

Extending radially inward from at least a portion of the outer surface 198 of the retaining member 194 is a retaining member groove 212. According to the embodiment illustrated in FIGS. 2-2D of the disclosure and as a non-limiting example, the retaining member groove 212 is concave in shape. The retaining member groove 212 on the outer surface 198 of the retaining member 194 reduces the overall cost and weight of the retaining member 194. Additionally, the retaining member groove 212 provides a grip enhancement portion, which reduces overall costs associated with assembling the retaining member 194 onto the substantially cylindrical attachment portion 188 of the flexible boot 168.

According to the embodiment of the disclosure illustrated in FIG. 2B, when the retaining member 194 is tightened, at least a portion of the first boot retention leg 208 comes into direct contact with at least a portion of a valley portion 214 of the groove 190 in the substantially cylindrical attachment portion 188 of the flexible boot 168. Additionally, as illustrated in FIG. 2B, when the retaining member 194 is tightened, at least a portion of an inner surface 216 of the substantially cylindrical body portion 202 is in direct contact with at least a portion of the outer surface 178 of the substantially cylindrical attachment portion 188 of the flexible boot 168. As a result, when the retaining member 194 is tightened, the first and second boot retention legs 208 and 210 ensure that at least a portion of the substantially cylindrical attachment portion 188 of the flexible boot 168 is retained underneath the substantially cylindrical body portion 202 of the retaining member 194. This prevents all or substantially all of the axial extrusion of the second end portion 176 of the flexible boot 168 from under the retaining member 194 when radially compressed thereby increasing the amount of friction between the flexible boot 168 and the second shaft 146 and increasing the overall performance of the flexible boot 168 at low temperatures.

In accordance with an alternative embodiment of the disclosure illustrated in FIG. 2C, when the retaining member 194 is tightened, the first boot retention leg 208 does not come into direct contact with the valley portion 214 of the groove 190 in the substantially cylindrical attachment portion 188 of the flexible boot 168. As a result, there is a first boot retention leg gap 218 between the first boot retention leg 208 and the valley portion 214 of the groove 190. Additionally, as illustrated in FIG. 2C, when the retaining member 194 is tightened, at least a portion of the inner surface 216 of the substantially cylindrical body portion 202 is in direct contact with at least a portion of the outer surface 178 of the substantially cylindrical attachment portion 188 of the flexible boot 168. As a result, the body portion 202 of the boot retaining member 194 applies a compressive or clamping force onto the substantially cylindrical attachment portion 188 of the flexible boot 168 thereby sealingly engaging the substantially cylindrical attachment portion 188 to at least a portion of the outer surface 152 of the second shaft 146. As previously discussed, when the retaining member 194 is tightened, the first and second boot retention legs 208 and 210 ensure that at least a portion of the substantially cylindrical attachment portion 188 of the flexible boot 168 is retained underneath the substantially cylindrical body portion 202 of the retaining member 194. This prevents all or substantially all of the axial extrusion of the flexible boot 168 from under the retaining member 194 when radially compressed thereby increasing the amount of friction between the flexible boot 168 and the second shaft 146 and increasing the overall performance of the flexible boot 168 at low temperatures.

According to another embodiment of the disclosure illustrated in FIG. 2D, when the retaining member 194 is tightened, at least a portion of the first boot retention leg 208 comes into direct contact with at least a portion of the valley portion 214 of the groove 190 in the substantially cylindrical attachment portion 188 of the flexible boot 168. Additionally, as illustrated in FIG. 2D, when the retaining member 194 is tightened, the inner surface 216 of the substantially cylindrical body portion 202 is not in direct contact with the outer surface 178 of the substantially cylindrical attachment portion 188 of the flexible boot 168. As a result, there is a substantially cylindrical body portion gap 220 between the substantially cylindrical body portion 202 and the outer surface 178 of the substantially cylindrical attachment portion 188 of the flexible boot 168. As previously discussed, when the retaining member 194 is tightened, the first and second boot retention legs 208 and 210 ensure that at least a portion of the substantially cylindrical attachment portion 188 of the flexible boot 168 is retained underneath the substantially cylindrical body portion 202 of the retaining member 194. This prevents all or substantially all of the axial extrusion of the flexible boot 168 from under the retaining member 194 when radially compressed thereby increasing the amount of friction between the flexible boot 168 and the second shaft 146 and increasing the overall performance of the flexible boot 168 at low temperatures.

It is within the scope of this disclosure that the second boot retention leg 210 may come into direct contact with at least a portion of the outer surface 152 of the second shaft 146 when the retaining member 194 is tightened. The length L2 of the second boot retention leg 210 may be of a length such that when the second boot retention leg 210 comes into contact with the outer surface 152 of the second shaft 146, the retaining member 194 applies an optimal amount of clamping force onto the flexible boot 168 and the second, shaft 146. As a result, the second boot retention leg 210 aids in the assembly process for the flexible boot and retaining member assembly 102 by ensuring that flexible boot 168 is properly secured and sealed against the outer surface 152 of the second shaft 146, thereby increasing the overall life and durability of the of the constant velocity joint assembly 100.

Figure 3:
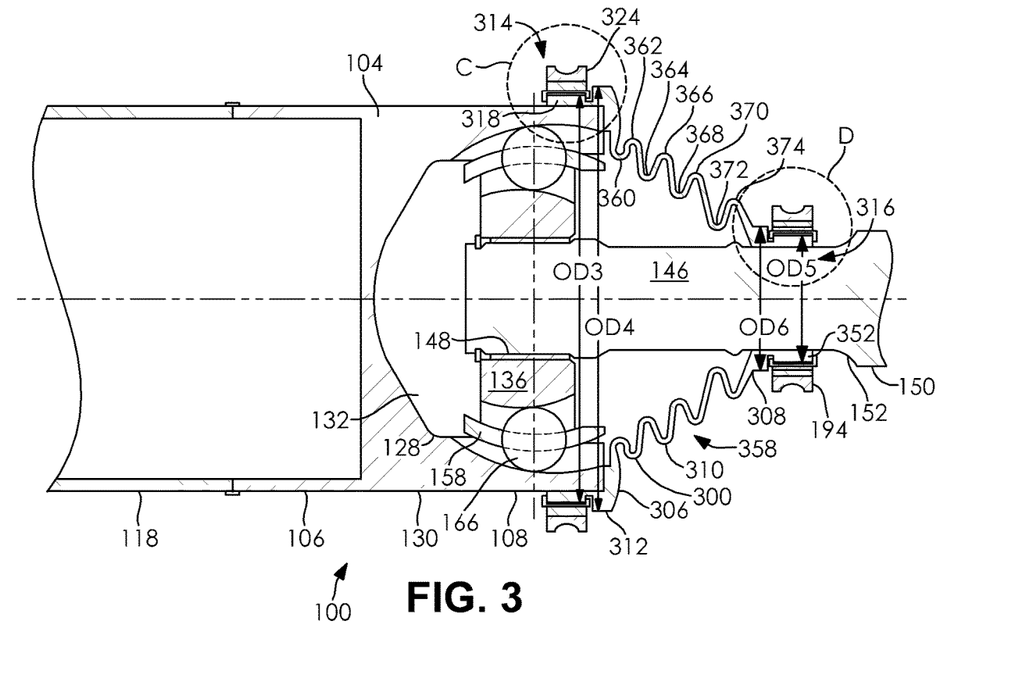
FIG. 3 is a schematic side-view of the constant velocity joint assembly illustrated in FIG. 2 having a pair of flexible boot and retaining member assemblies according to another embodiment of the disclosure.
Figure 3A:
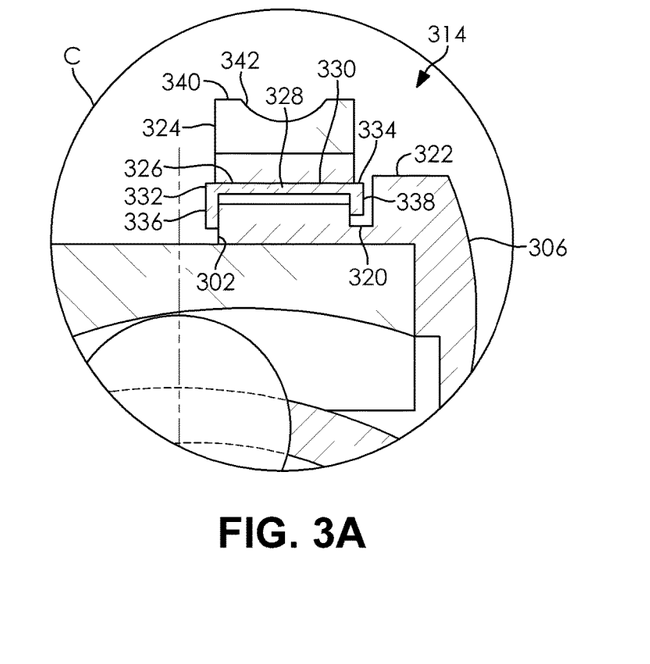
FIG. 3A is a schematic detailed-view of a portion of the first flexible boot and retaining member assembly illustrated in FIG. 3.
Figure 3B:
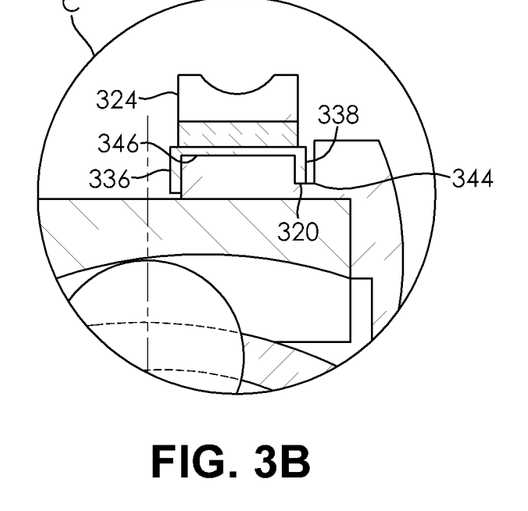
FIG. 3B is a detailed-view of a portion of the flexible boot and retaining member assembly illustrated in FIG. 3 according to an embodiment of the disclosure when the retaining member is tightened around the flexible boot.
Figure 3C:
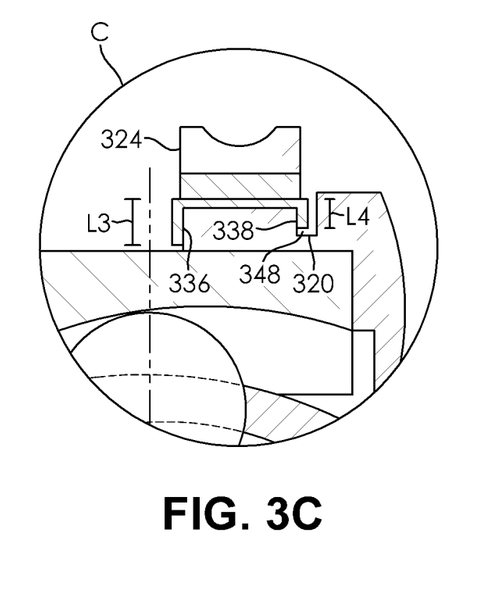
FIG. 3C is a detailed-view of a portion of the flexible boot and retaining member assembly illustrated in FIG. 3 according to an alternative embodiment of the disclosure when the retaining member is tightened around the flexible boot.
Figure 3D:
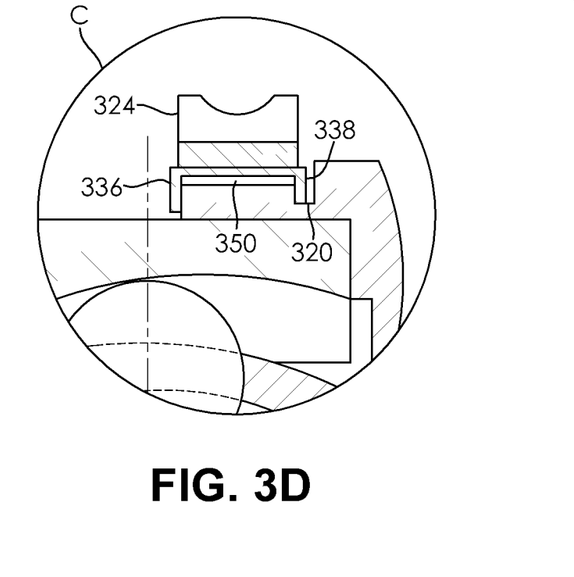
FIG. 3D is a detailed-view of a portion of the flexible boot and retaining member assembly illustrated in FIG. 3 according to another embodiment of the disclosure when the retaining member is tightened around the flexible boot.
Figure 3E:
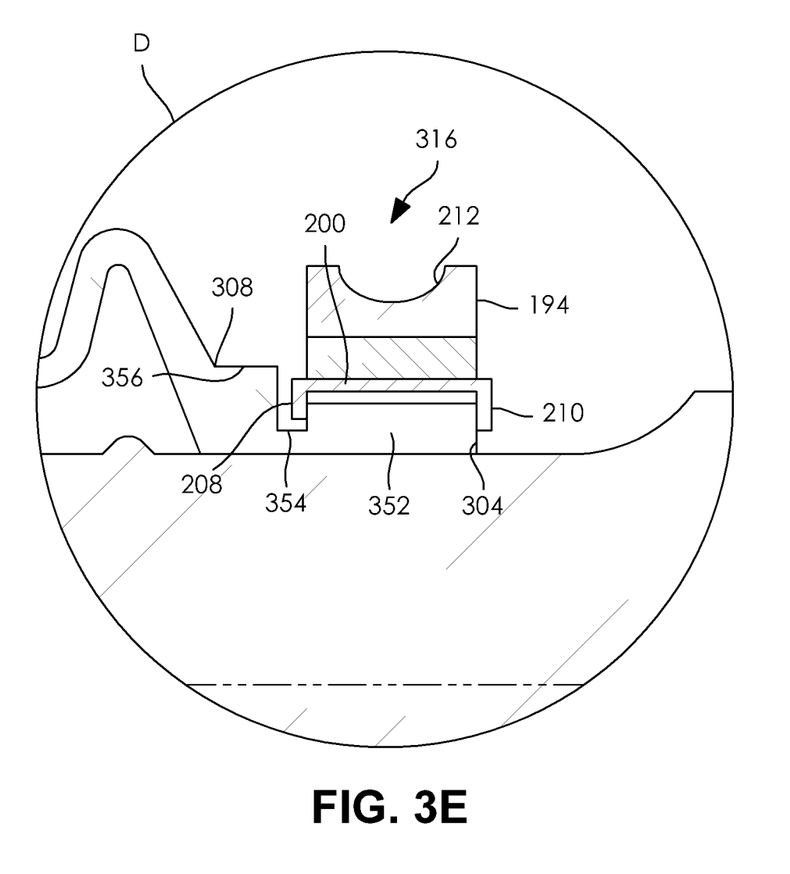
FIG. 3E is a schematic detailed-view of a portion of the second flexible boot and retaining member assembly illustrated in FIG. 3.

FIGS. 3-3E are a schematic side-view of the constant velocity joint assembly 100 illustrated in FIG. 2 according to an alternative embodiment of the disclosure. The constant velocity joint assembly 100 illustrated in FIGS. 2-2D is the same as the constant velocity joint assembly 100 illustrated in FIGS. 3-3E, except where specifically noted below. In accordance with this embodiment of the disclosure, the constant velocity joint assembly 100 does not include the use of the boot can 180.

According to the embodiment illustrated in FIGS. 3-3E of the disclosure, the constant velocity joint assembly 100 includes a flexible boot 300 having a first end 302, a second end 304, a first end portion 306, a second end portion 308, an intermediate portion 310 and an outer surface 312. The flexible boot 300 provides a flexible seal for the constant velocity joint assembly 100 preventing the migration of dust, debris and moisture from the external environment into the constant velocity joint assembly 100. As illustrated in FIGS. 3 and 3E of the disclosure, the second end portion 308 of the flexible boot 300 is attached directly to at least a portion of the outer surface 152 of the second shaft 146 by using a flexible boot and retaining member assembly 316 having the retaining member 194 illustrated in FIGS. 2-2D. Additionally, as illustrated in FIGS. 3-3D of the disclosure, the first end portion 306 of the flexible boot 300 is attached directly to at least a portion of the outer surface 130 of the second end portion 108 of the outer race 104 by using an additional flexible boot and retaining member assembly 314 having an additional retaining member 324. As a non-limiting example, the flexible boot 300 is made of a polymeric material, a rubber material, an elastomeric material, a thermoplastic material or a combination thereof.

The first end portion 306 of the flexible boot 300 has a substantially cylindrical attachment portion 318. Circumferentially extending along at least a portion of the outer surface 312 of the substantially cylindrical attachment portion 318 of the first end portion 306 of the flexible boot 300 is a groove 320 having a shoulder portion 322. As illustrated in FIGS. 3-3D of the disclosure, the groove 320 extends radially inward from the outer surface 312 of the substantially cylindrical attachment portion 318 of the first end portion 306 of the flexible boot 300. In accordance with the embodiment of the disclosure illustrated in FIGS. 3-3D and as a non-limiting example, the substantially cylindrical attachment portion 318 of the first end portion 306 of the flexible boot 300 has an outer diameter OD3 that is smaller than an outer diameter OD4 of the shoulder portion 322 of the flexible boot 300.

Disposed at least partially radially outboard from at least a portion of the substantially cylindrical attachment portion 318 of the first end portion 306 of the flexible boot 300 is the additional retaining member 324. The additional retaining member 324 illustrated in FIGS. 3 and 3A of the disclosure, is the same as the retaining member 194 in FIGS. 2-2D except the additional retaining member 324 in FIGS. 3-3D is a mirror image of the retaining member 194 in FIGS. 2-2D. Additionally, the additional retaining member 324 in FIGS. 3-3D has a larger internal diameter than the retaining member 194 in FIGS. 2-2D of the disclosure. When tightened, the additional retaining member 324 applies a compressive force or a clamping force onto the substantially cylindrical attachment portion 318 of the first end portion 306 of the flexible boot 300. The compressive force or clamping force of the additional retaining member 324 provides a sealing engagement between at least a portion of the substantially cylindrical attachment portion 318 of the flexible boot 300 and at least a portion of the outer surface 130 of the second end portion 108 of the outer race 104.

Extending radially inward from at least a portion of an inner surface 326 of the additional retaining member 324 is a boot retention portion 328 of the additional retaining member 324. As illustrated in FIGS. 3-3D, the boot retention portion 328 of the additional retaining member 324 has substantially cylindrical body portion 330 having a first end 332 and a second end 334. According to an embodiment of the disclosure, the boot retention portion 328 of the additional retaining member 324 is integrally formed as part of the additional retaining member 324. In accordance with an alternative embodiment of the disclosure, the boot retention portion 328 of the additional retaining member 324 is not integrally formed as part of the additional retaining member 324. As a non-limiting example, at least a portion of the substantially cylindrical body portion 330 of the boot retention portion 328 is integrally connected to at least a portion of the inner surface 326 of the additional retaining member 324 by using one or more welds, one or more adhesive, a threaded connection and/or one or more mechanical fasteners.

Extending radially inward from the first end 332 of the substantially cylindrical body portion 330 of the boot retention portion 328 of the additional retaining member 324 is a first boot retention leg 336. A second boot retention leg 338 extends radially inward from the second end 334 of the boot retention portion 328 of the additional retaining member 324. As illustrated in FIGS. 3-3D and as a non-limiting example, the substantially cylindrical body portion 330, the first boot retention leg 336 and the second boot retention leg 338 forms a substantially U-shaped cross section. According to an embodiment of the disclosure and as a non-limiting example, the first boot retention leg 336 has a length L3 that is larger than a length L4 of the second boot retention leg 338 of the boot retention portion 328 of the additional retaining member 324.

In accordance with an alternative embodiment of the disclosure (not shown), the retaining member 324 circumferentially extends radially outboard from at least a portion of the substantially cylindrical body portion 330 of the boot retention portion 328. As a result, the retaining member 324 only extends partially around the substantially cylindrical body portion 330 of the boot retention portion 328.

As illustrated in FIGS. 3-3D of the disclosure, at least a portion of the second boot retention leg 338 is disposed within the groove 320 of the substantially cylindrical attachment portion 318 of the first end portion 306 of the flexible boot 300. Additionally, as illustrated in FIGS. 3-3D of the disclosure, the first boot retention leg 336 is disposed directly adjacent to and axially outboard from the first end 302 of the flexible boot 300. At least a portion of the first boot retention leg 336 is in direct contact with the first end 302 of the flexible boot 300 of the constant velocity joint assembly 100. As a result, when the additional retaining member 324 is tightened, the first and second boot retention legs 336 and 338 ensure that at least a portion of the substantially cylindrical attachment portion 318 of the first end portion 306 of the flexible boot 300 is retained underneath the substantially cylindrical body portion 330 of the additional retaining member 324. This prevents all or substantially all of the axial extrusion of the first end portion 306 of the flexible boot 300 from under the additional retaining member 324 when radially compressed thereby increasing the amount of friction between the flexible boot 300 and the outer race 104 and increasing the overall performance of the flexible boot 300 at low temperatures.

Extending radially inward from at least a portion of an outer surface 340 of the additional retaining member 324 is a retaining member groove 342. According to the embodiment illustrated in FIGS. 3 and 3A of the disclosure and as a non-limiting example, the retaining member groove 342 is concave in shape. The retaining member groove 342 on the outer surface 340 of the additional retaining member 324 reduces the overall cost and weight of the additional retaining member 324. Additionally, the retaining member groove 342 provides a grip enhancement portion, which reduces overall costs associated with assembling the additional retaining member 324 onto the substantially cylindrical attachment portion 318 of the first end portion 306 of the flexible boot 300.

According to the embodiment of the disclosure illustrated in FIG. 3B, when the additional retaining member 324 is tightened, at least a portion of the second boot retention leg 338 comes into direct contact with at least a portion of a valley portion 344 of the groove 302 in the first end portion 306 of the flexible boot 168. Additionally, when the additional retaining member 324 is tightened, at least a portion of an inner surface 346 of the substantially cylindrical body portion 330 is in direct contact with at least a portion of the outer surface 312 of the substantially cylindrical attachment portion 318 of the first end portion 306 of the flexible boot 300. As a result, when the additional retaining member 324 is tightened, the first and second boot retention legs 336 and 338 ensure that at least a portion of the substantially cylindrical attachment portion 318 of the first end portion 306 of the flexible boot 300 is retained underneath the substantially cylindrical body portion 330 of the retaining member 324. This prevents all or substantially all of the axial extrusion of the first end portion 306 of the flexible boot 300 from under the additional retaining member 324 when radially compressed thereby increasing the amount of friction between the flexible boot 300 and the outer race 104 and increasing the overall performance of the flexible boot 300 at low temperatures.

In accordance with an alternative embodiment of the disclosure illustrated in FIG. 3C, when the additional retaining member 324 is tightened, the second boot retention leg 338 does not come into direct contact with the valley portion 344 of the groove 320 in the first end portion 306 of the flexible boot 300. As a result, there is a boot retention leg gap 348 between the second boot retention leg 338 and the valley portion 344 of the groove 320. Additionally, when the additional retaining member 324 is tightened, at least a portion of the inner surface 346 of the substantially cylindrical body portion 330 is in direct contact with at least a portion of the outer surface 312 of the substantially cylindrical attachment portion 318 of the first end portion 306 of the flexible boot 300. As previously discussed, when the additional retaining member 324 is tightened, the first and second boot retention legs 336 and 338 ensure that at least a portion of the substantially cylindrical attachment portion 318 of the first end portion 306 of the flexible boot 300 is retained underneath the substantially cylindrical body portion 330 of the retaining member 324. This prevents all or substantially all of the axial extrusion of the first end portion 306 of the flexible boot 300 from under the additional retaining member 324 when radially compressed thereby increasing the amount of friction between the flexible boot 300 and the outer race 104 and increasing the overall performance of the flexible boot 300 at low temperatures.

According to another embodiment of the disclosure illustrated in FIG. 3D, when the additional retaining member 324 is tightened, at least a portion of the second boot retention leg 338 comes into direct contact with at least a portion of the valley portion 344 of the groove 320 in the first end portion 306 of the flexible boot 300. Additionally, as illustrated in FIG. 3D, when the additional retaining member 324 is tightened, the inner surface 346 of the substantially cylindrical body portion 330 is not in direct contact with the outer surface 312 of the substantially cylindrical attachment portion 318 of the first end portion 306 of the flexible boot 300. As a result, there is a substantially cylindrical body portion gap 350 between the substantially cylindrical body portion 330 and the outer surface 312 of the substantially cylindrical attachment portion 318 first end portion 306 of the flexible boot 300. As previously discussed, when the additional retaining member 324 is tightened, the first and second boot retention legs 336 and 338 ensure that at least a portion of the substantially cylindrical attachment portion 318 of the first end portion 306 of the flexible boot 300 is retained underneath the substantially cylindrical body portion 330 of the retaining member 324. This prevents all or substantially all of the axial extrusion of the first end portion 306 of the flexible boot 300 from under the additional retaining member 324 when radially compressed thereby increasing the amount of friction between the flexible boot 300 and the outer race 104 and increasing the overall performance of the flexible boot 300 at low temperatures.

The second end portion 308 of the flexible boot 300 has a substantially cylindrical attachment portion 352. Circumferentially extending along at least a portion of the outer surface 312 of the substantially cylindrical attachment portion 352 of the second end portion 308 of the flexible boot 300 is a groove 354 having a shoulder portion 356. As illustrated in FIGS. 3 and 3E of the disclosure, the groove 354 extends radially inward from the outer surface 312 of the substantially cylindrical attachment portion 352 of the second end portion 308 of the flexible boot 300. In accordance with the embodiment of the disclosure illustrated in FIGS. 3 and 3E and as a non-limiting example, the substantially cylindrical attachment portion 354 of the second end portion 308 of the flexible boot 300 has an outer diameter OD5 that is smaller than an outer diameter OD6 of the shoulder portion 356 of the flexible boot 300.

Disposed at least partially radially outboard from at least a portion of the substantially cylindrical attachment portion 352 of the second end portion 308 of the flexible boot 300 is the retaining member 194. The retaining member 194 illustrated in FIGS. 3 and 3E of the disclosure, is the same as the retaining member 194 in FIGS. 2-2D. Additionally, the retaining member 194 in FIGS. 3 and 3E is the same as the additional retaining member 324 connected to the outer surface 130 of the outer race 104 except that retaining member 194 in FIGS. 3 and 3E is a mirror image of the additional retaining member 324 in FIGS. 2-2D. Furthermore, the retaining member 194 illustrated in FIGS. 3 and 3E is the same as the additional retaining member 324 illustrated in FIGS. 3-3D except the additional retaining member 324 has a larger inner diameter than the retaining member 194 illustrated in FIGS. 3 and 3E. When tightened, the retaining member 194 applies a compressive force or a clamping force onto the substantially cylindrical attachment portion 352 of the second end portion 308 of the flexible boot 300. The compressive or clamping force of the retaining member 194 provides a sealing engagement between at least a portion of the substantially cylindrical attachment portion 352 of the second end portion 308 of the flexible boot 300 and at least a portion of the outer surface 152 of the second shaft 146.

As illustrated in FIGS. 3 and 3E of the disclosure, at least a portion of the first boot retention leg 208 is disposed within the groove 354 in the outer surface 312 of the substantially cylindrical attachment portion 352 of the second end portion 308 of the flexible boot 300. Additionally as illustrated in FIGS. 3 and 3E of the disclosure, the second boot retention leg 210 is disposed directly adjacent to and axially outboard from the second end 304 of the flexible boot 300. At least a portion of the second boot retention leg 210 is in direct contact with the second end 304 of the flexible boot 300 of the constant velocity joint assembly 100. As a result, when the retaining member 194 is tightened, the first and second boot retention legs 208 and 210 ensure that at least a portion of the substantially cylindrical attachment portion 352 of the second end portion 308 of the flexible boot 300 is retained underneath the substantially cylindrical body portion 202 of the retaining member 194. This prevents all or substantially all of the axial extrusion of the second end portion 308 of the flexible boot 300 from under the retaining member 194 when radially compressed thereby increasing the amount of friction between the flexible boot 300 and the second shaft 146 and increasing the overall performance of the flexible boot 300 at low temperatures.

The intermediate portion 310 of the flexible boot 300 has a plurality of convolutions 358. In accordance with the embodiment of the disclosure illustrated in FIG. 3 and as a non-limiting example, the intermediate portion 310 of the flexible boot 300 includes, in axial order, a first trough 360, a first peak 362, a second trough 364, a second peak 366, a third trough 368, a third peak 370, a fourth trough 372 and a fourth peak 374. The first trough 360 is connected to the first end portion 306 of the flexible boot 300 and the fourth peak 374 is connected to the second end portion 308 of the flexible boot 300. It is within the scope of this disclosure that the intermediate portion 310 of the flexible boot 300 may include more convolutions or less convolutions.

Figure 4:
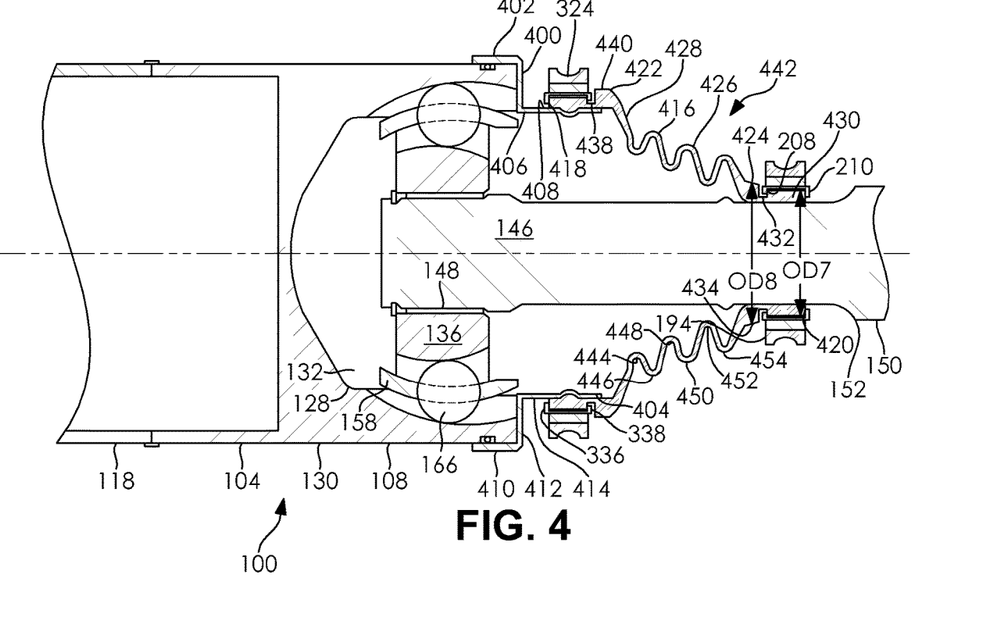
FIG. 4 is a schematic side-view of the constant velocity joint assembly illustrated in FIGS. 2 and 3 having a pair of flexible boot and retaining member assemblies according to still another embodiment of the disclosure.

FIG. 4 is a schematic side-view of the constant velocity joint assembly 100 illustrated in FIGS. 2 and 3 according to still another embodiment of the disclosure. The constant velocity joint assembly 100 illustrated in FIGS. 2-3E is the same as the constant velocity joint assembly 100 illustrated in FIG. 4, except where specifically noted below. In accordance with this embodiment of the disclosure, the constant velocity joint assembly 100 has a boot can 400 having a first end portion 402, a second end portion 404, an inner surface 406 and an outer surface 408. As a non-limiting example, the boot can 400 is made of a substantially rigid material such as a metallic material, an aluminum alloy, a steel alloy, a carbon fibre material or a composite material.

At least a portion of the first end portion 402 of the boot can 400 is integrally connected to at least a portion of the outer surface 130 of the second end portion 108 of the outer race 104. In accordance with the embodiment of the disclosure illustrated in FIG. 4 and as a non-limiting example, the boot can 400 includes, in axial order, a first substantially horizontal portion 410, a substantially vertical portion 412 and a second substantially horizontal portion 414. As illustrated in FIG. 4, an end of the substantially vertical portion 412 is connected to an end of the first horizontal portion 410 and an end of the substantially vertical portion 412 opposite the first substantially horizontal portion 410 is connected to the second horizontal portion 414. The second substantially horizontal portion 414 of the boot can 400 provides a boot attachment portion.

Disposed radially outboard from the second shaft 146 of the constant velocity joint assembly 100 is a flexible boot 416 having a first end 418, a second end 420, a first end portion 422, a second end portion 424, an intermediate portion 426 and an outer surface 428. The flexible boot 416 provides a flexible seal for the constant velocity joint assembly 100 preventing the migration of dust, debris and moisture from the external environment into the constant velocity joint assembly 100. In accordance with an embodiment of the disclosure and as a non-limiting example, the flexible boot 416 is made of a polymeric material, a rubber material, an elastomeric material, a thermoplastic material or a combination thereof.

The second end portion 424 of the flexible boot 416 has a substantially cylindrical attachment portion 430. Circumferentially extending along at least a portion of the outer surface 428 of the substantially cylindrical attachment portion 430 of the second end portion 424 of the flexible boot 416 is a groove 432 having a shoulder portion 434. As illustrated in FIG. 4 of the disclosure, the groove 432 extends radially inward from the outer surface 428 of the substantially cylindrical attachment portion 430 of the second end portion 424 of the flexible boot 416. In accordance with the embodiment of the disclosure illustrated in FIG. 4 and as a non-limiting example, the substantially cylindrical attachment portion 430 of the second end portion 424 of the flexible boot 416 has an outer diameter OD7 that is smaller than an outer diameter OD8 of the shoulder portion 434 of the flexible boot 416.

Disposed at least partially radially outboard from at least a portion of the substantially cylindrical attachment portion 430 of the second end portion 424 of the flexible boot 416 is the retaining member 194. The retaining member 194 illustrated in FIG. 4 of the disclosure, is the same as the retaining member 194 in FIGS. 2-2D, 3 and 3E. When tightened, the retaining member 194 applies a compressive force or a clamping force onto the substantially cylindrical attachment portion 430 of the second end portion 424 of the flexible boot 416. The compressive or clamping force of the retaining member 194 provides a sealing engagement between at least a portion of the substantially cylindrical attachment portion 430 of the second end portion 424 of the flexible boot 416 and at least a portion of the outer surface 152 of the second shaft 146.

As illustrated in FIG. 4 of the disclosure, at least a portion of the first boot retention leg 208 is disposed within the groove 432 in the outer surface 428 of the substantially cylindrical attachment portion 430 of the second end portion 424 of the flexible boot 416. Additionally as illustrated in FIG. 4 of the disclosure, the second boot retention leg 210 is disposed directly adjacent to and axially outboard from the second end 420 of the flexible boot 416. At least a portion of the second boot retention leg 210 is in direct contact with the second end 420 of the flexible boot 416 of the constant velocity joint assembly 100. As a result, when the retaining member 194 is tightened, the first and second boot retention legs 208 and 210 ensure that at least a portion of the substantially cylindrical attachment portion 430 of the second end portion 424 of the flexible boot 416 is retained underneath the substantially cylindrical body portion 202 of the retaining member 194. This prevents all or substantially all of the axial extrusion of the second end portion 424 of the flexible boot 416 from under the retaining member 194 when radially compressed thereby increasing the amount of friction between the flexible boot 416 and the second shaft 146 and increasing the overall performance of the flexible boot 416 at low temperatures.

The first end portion 422 of the flexible boot 416 has a substantially cylindrical attachment portion 436. Circumferentially extending along at least a portion of the outer surface 428 of the substantially cylindrical attachment portion 436 of the first end portion 422 of the flexible boot 416 is a groove 438 having a shoulder portion 440. As illustrated in FIG. 4 of the disclosure, the groove 438 extends radially inward from the outer surface 428 of the substantially cylindrical attachment portion 436 of the first end portion 422 of the flexible boot 416. In accordance with the embodiment of the disclosure illustrated in FIG. 4 and as a non-limiting example, the substantially cylindrical attachment portion 436 of the first end portion 422 of the flexible boot 416 has an outer diameter OD9 that is smaller than an outer diameter OD10 of the shoulder portion 440 of the flexible boot 416.

Disposed at least partially radially outboard from at least a portion of the substantially cylindrical attachment portion 436 of the first end portion 422 of the flexible boot 416 is the additional retaining member 324. The additional retaining member 324 illustrated in FIG. 4, is the same as the additional retaining member 324 in FIGS. 3-3D except that the additional retaining member 324 in FIG. 4 has a smaller internal diameter than the additional retaining member 324 in FIGS. 3-3D of the disclosure. When tightened, the additional retaining member 324 applies a compressive force or a clamping force onto the substantially cylindrical attachment portion 436 of the first end portion 422 of the flexible boot 416. The compressive or clamping force of the additional retaining member 324 provides a sealing engagement between at least a portion of the substantially cylindrical attachment portion 436 of the first end portion 422 of the flexible boot 416 and at least a portion of the outer surface 408 of the second substantially horizontal portion 414 of the boot can 400.

As illustrated in FIG. 4 of the disclosure, at least a portion of the second boot retention leg 338 is disposed within the groove 438 in the outer surface 428 of the substantially cylindrical attachment portion 436 of the first end portion 422 of the flexible boot 416. Additionally, as illustrated in FIG. 4 of the disclosure, the first boot retention leg 336 is disposed directly adjacent to and axially outboard from the first end 418 of the flexible boot 416. At least a portion of the first boot retention leg 336 is in direct contact with the second first end 418 of the flexible boot 416 of the constant velocity joint assembly 100. As a result, when the additional retaining member 324 is tightened, the first and second boot retention legs 336 and 338 ensure that at least a portion of the substantially cylindrical attachment portion 436 of the first end portion 422 of the flexible boot 416 is retained underneath the substantially cylindrical body portion 330 of the additional retaining member 324. This prevents all or substantially all of the axial extrusion of the first end portion 422 of the flexible boot 416 from under the additional retaining member 324 when radially compressed thereby increasing the amount of friction between the flexible boot 416 and the boot can 400 and increasing the overall performance of the flexible boot 416 at low temperatures.

The intermediate portion 426 of the flexible boot 416 has a plurality of convolutions 442. In accordance with the embodiment of the disclosure illustrated in FIG. 4 and as a non-limiting example, the intermediate portion 426 of the flexible boot 416 includes, in axial order, a first trough 444, a first peak 446, a second trough 448, a second peak 450, a third trough 452 and a third peak 454. The first trough 444 is connected to the first end portion 422 of the flexible boot 416 and the third peak 454 is connected to the second end portion 424 of the flexible boot 416. It is within the scope of this disclosure that the intermediate portion 426 of the flexible boot 416 may include more convolutions or less convolutions.

Figure 5:
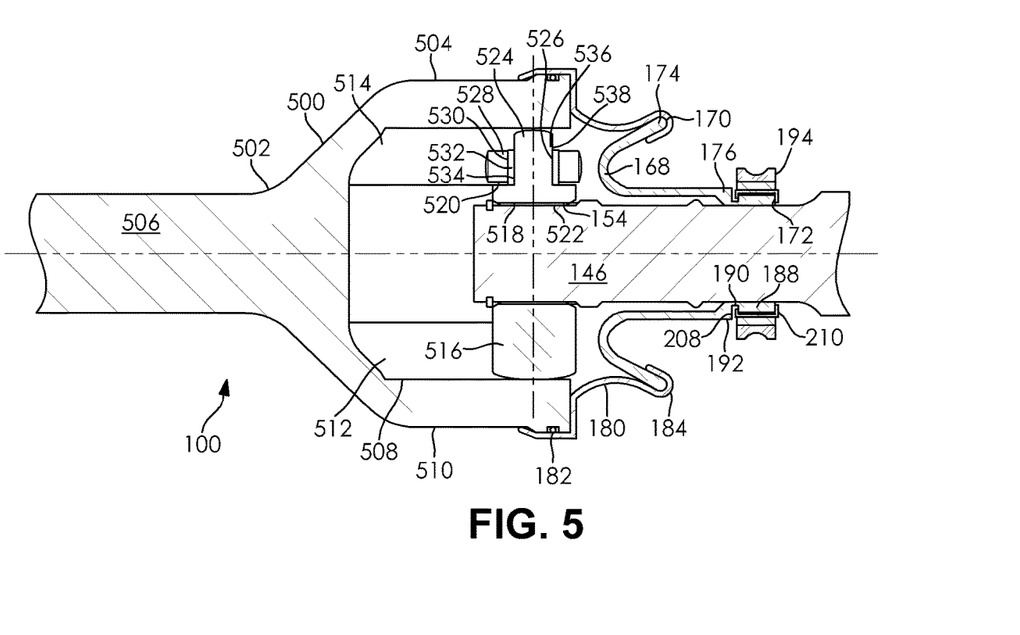
FIG. 5 is a schematic side-view of the constant velocity joint assembly illustrated in FIGS. 2-4 according to yet another embodiment of the disclosure.

FIG. 5 is a schematic side-view of the constant velocity joint assembly 100 illustrated in FIGS. 2-4 according to yet another embodiment of the disclosure. The constant velocity joint assembly 100 illustrated in FIG. 5 is the same as the constant velocity joint assembly illustrated in FIGS. 2-4, except where specifically noted below. According to this embodiment of the disclosure and as a non-limiting example, the constant velocity joint assembly 100 is a tripod type constant velocity joint with articulation and plunging capabilities.

As illustrated in FIG. 5 of the disclosure, the constant velocity joint assembly 100 has an outer race 500 having a first end portion 502 and a second end portion 504. At least a portion of the first end portion 502 of the outer race 500 is connected to an end of a first shaft 506 that extends co-axially with the first end portion 502 of the outer race 500. According to the embodiment of the disclosure illustrated in FIG. 5 and as a non-limiting example, at least a portion of the first end portion 502 of the outer race 500 is integrally connected to at least a portion of the end of the first shaft 506 by using one or more welds. In accordance with an alternative embodiment of the disclosure (not shown), at least a portion of the first end portion of the outer race is drivingly connected to at least a portion of the end of the shaft by using a threaded connection, a splined connection and/or one or more mechanical fasteners. As a non-limiting example, the first shaft 506 is a propeller shaft, a drive shaft, a cardan shaft, a double cardan shaft, a universal joint shaft, a universal coupling shaft or a Hooke's joint shaft.

The second end portion 504 of the outer race 500 has an inner surface 508 and an outer surface 510 defining a hollow portion 512 therein. Circumferentially extending along at least a portion of the inner surface 508 of the second end portion 504 of the outer race 500 is one or more outer race torque transfer grooves 514.

At least partially disposed within the hollow portion 512 of the second end portion 504 of the outer race 500 is a spider 516 having an inner surface 518 and an outer surface 520. The spider 516 extends co-axially with the second shaft 146 of the constant velocity joint assembly 100. Circumferentially extending from at least a portion of the inner surface 518 of the spider 516 is a plurality of axially extending splines 522 that are complementary to and meshingly engaged with the plurality of axially extending second shaft splines 154 on the outer surface 152 of the first end portion 148 of the second shaft 146.

Extending from the outer surface 520 of the spider 516 is one or more trunnions 524 having an outer surface 526. As illustrated in FIG. 5 of the disclosure, at least a portion of the one or more trunnions 524 extend within the one or more outer race torque transfer grooves 514 in the inner surface 508 of the second end portion 504 of the outer race 500. According to an embodiment of the disclosure and as a non-limiting example, the one or more trunnions 524 are substantially cylindrical in shape.

Interposed between the one or more outer race torque transfer grooves 514 of the outer race 500 and the outer surface 526 of the one or more trunnions 524 is an outer roller element 528 having a substantially cylindrical internal surface 530. The outer roller element 528 drivingly connects the second shaft 146 to the outer race 500 of the constant velocity joint assembly 100. Additionally, the outer roller element 528 is freely rotatable thereby reducing the amount of friction between the one or more trunnions 524 and the outer race 500 of the constant velocity joint assembly 100 when in operation.

An inner roller element 532 having a substantially cylindrical internal surface 534 is interposed between the substantially cylindrical internal surface 530 of the outer roller element 528 and the outer surface 526 of the one or more trunnions 524 of the constant velocity joint assembly 100. The inner rolling element 532 aids in reducing the amount of friction between the outer roller element 528 and the one or more trunnions 524 when in operation. As a non-limiting example, the inner roller element 532 is a needle bearing assembly or a bushing.

Disposed radially outboard from the inner roller element 532 is a trunnion snap-ring groove 536. As illustrated in FIG. 5 of the disclosure, the trunnion snap-ring groove 536 circumferentially extends along at least a portion of the outer surface 526 of the one or more trunnions 524.

At least a portion of a trunnion snap-ring 538 is disposed within the trunnion snap-ring groove 536 on the outer, surface 526 of the one or more trunnions 524 of the constant velocity joint assembly 100. The snap-ring 538 radially retains the inner roller element 532 and/or the outer roller element 528 on the one or more trunnions 524 of the constant velocity joint assembly 100.

As illustrated in FIG. 5 of the disclosure, at least a portion of the first end portion 182 of the boot can 180 is integrally connected to at least a portion of the outer surface 510 of the second end portion 504 of the outer race 500.

In accordance with this embodiment of the disclosure, when the retaining member 194 is tightened, the first and second boot retention legs 208 and 210 ensure that at least a portion of the substantially cylindrical attachment portion 188 of the flexible boot 168 is retained underneath the substantially cylindrical body portion 202 of the retaining member 194. This prevents all or substantially all of the axial extrusion of the second end portion 176 of the flexible boot 168 from under the retaining member 194 when radially compressed thereby increasing the amount of friction between the flexible boot 168 and the second shaft 146 and increasing the overall performance of the flexible boot 168 at low temperatures.

It is within the scope of this disclosure that the flexible boot 300, the additional retaining member 324, the boot can 400 and/or the flexible boot 416 may be used in connection with the constant velocity joint assembly 100 illustrated in FIG. 5 of the disclosure.

Figure 6:
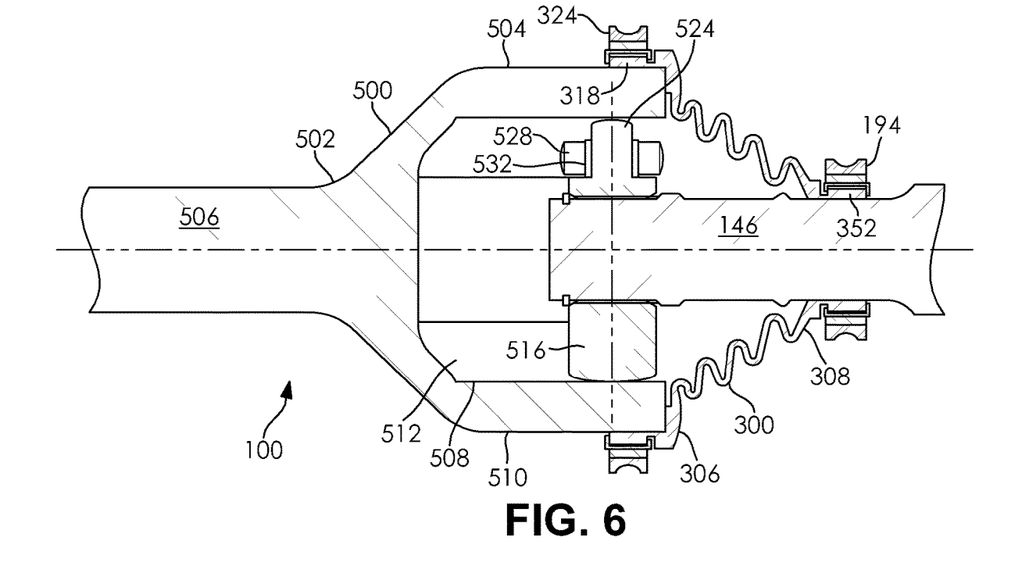
FIG. 6 is a schematic side-view of the constant velocity joint assembly illustrated in FIGS. 2-5 according to a further embodiment of the disclosure.

FIG. 6 is a schematic side-view of the constant velocity joint assembly 100 illustrated in FIGS. 2-5 according to a further embodiment of the disclosure. The constant velocity joint assembly 100 illustrated in FIG. 6 is the same as the constant velocity joint assembly illustrated in FIGS. 2-5, except where specifically noted below. In accordance with this embodiment of the disclosure, the constant velocity joint assembly 100 includes the use of the flexible boot 300 and the additional retaining member 324. As illustrated in FIG. 6, at least a portion of the substantially cylindrical attachment portion 318 of the first end portion 306 of the flexible boot 300 is directly connected to at least a portion of the outer surface 510 of the second end portion 504 of the outer race 500.

Disposed at least partially radially outboard from the substantially cylindrical attachment portion 318 of the first end portion 306 of the flexible boot 300 is the additional retaining member 324. When tightened, the additional retaining member 324 applies a compressive force or a clamping force onto the substantially cylindrical attachment portion 318 of the first end portion 306 of the flexible boot 300. The compressive force or clamping force of the additional retaining member 324 provides a sealing engagement between at least a portion of the substantially cylindrical attachment portion 318 of the flexible boot 300 and at least a portion of the outer surface 510 of the second end portion 504 of the outer race 500.

Figure 7:
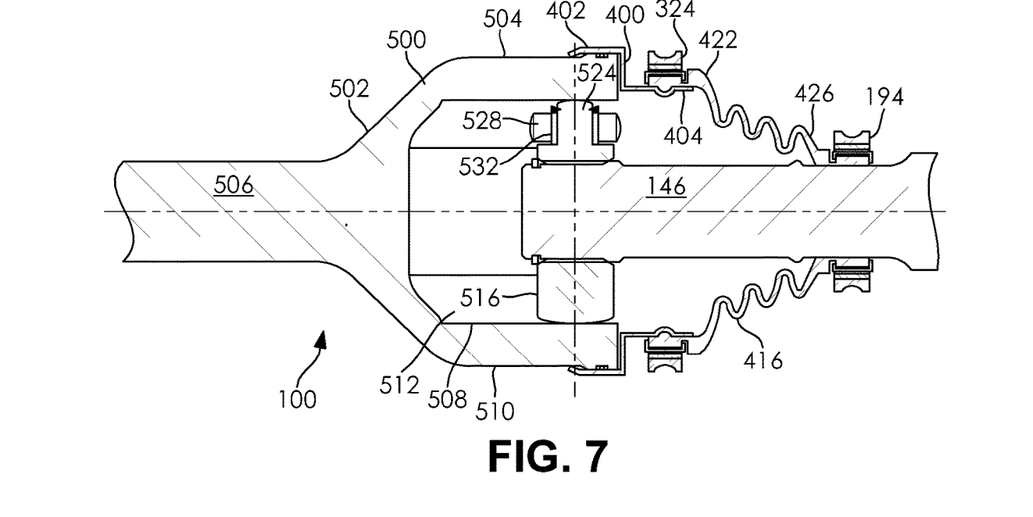
FIG. 7 is a schematic side-view of the constant velocity joint assembly illustrated in FIGS. 2-6 according to still a further embodiment of the disclosure.

FIG. 7 is a schematic side-view of the constant velocity joint assembly 100 illustrated in FIGS. 2-6 according to still a further embodiment of the disclosure. The constant velocity joint assembly 100 illustrated in FIG. 7 is the same as the constant velocity joint assembly illustrated in FIGS. 2-6, except where specifically noted below. In accordance with this embodiment of the disclosure, the constant velocity joint assembly 100 includes the use of the boot can 400, the flexible boot 416 and the additional retaining member 324. The additional retaining member 324 illustrated in FIG. 7, is the same as the additional retaining member 324 in FIGS. 3-3D and 6 except that the additional retaining member 324 in FIG. 7 has a smaller internal diameter that the additional retaining member 324 in FIGS. 3-3D and 6 of the disclosure. As illustrated in FIG. 7 of the disclosure, at least a portion of the first end portion 402 of the boot can 400 is connected to at least a portion of the outer surface 510 of the second end portion 504 of the outer race 500.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A constant velocity joint and flexible boot assembly, comprising:
   a constant velocity joint comprising an outer race having a first end portion and a second end portion;
      wherein said first end portion of said outer race is connected to a first shaft;
   a flexible boot having a first end portion, a second end portion and an outer surface;
      wherein said second end portion of said flexible boot has an attachment portion that is connected to an outer surface of a second shaft;
      wherein a groove circumferentially extends along at least a portion of said outer surface of said attachment portion of said second end portion of said flexible boot;
   a retaining member having an inner surface and an outer surface;
      wherein a first and a second boot retention leg extend radially inward from at least a portion of said inner surface of said retaining member;
      wherein at least a portion of said first boot retention leg of said retaining member is disposed within said groove in said outer surface of said attachment portion of said second end portion of said flexible boot;
      wherein at least a portion of said second boot retention leg of said retaining member is disposed axially outboard from said second end of said flexible boot and said groove in said outer surface of said attachment portion of said second end portion of said flexible boot;
      wherein said attachment portion of said second end portion of said flexible boot has an outer diameter;
      wherein said groove in said outer surface of said attachment portion of said second end portion of said flexible boot has a shoulder portion having an outer diameter; and
      wherein said outer diameter of said shoulder portion of said second end portion of said flexible boot is larger than said outer diameter of said attachment portion of said second end portion of said flexible boot.

2. The constant velocity joint and flexible boot assembly of claim 1, wherein said first boot retention leg of said retaining member has a length that is smaller than a length of said second boot retention leg of said retaining member.

3. The constant velocity joint and flexible boot assembly of claim 1, wherein said outer surface of said retaining member has a retaining member groove circumferentially extending along at least a portion of said outer surface of said retaining member.

4. The constant velocity joint and flexible boot assembly of claim 1, further comprising an additional retaining member having an inner surface and an outer surface;
 wherein a first and a second boot retention leg extend radially inward from at least a portion of said inner surface of said additional retaining member;
 wherein said first end portion of said flexible boot has an attachment portion that is connected to at least a portion of an outer surface of said second end portion of said outer race of said constant velocity joint assembly;
 wherein a groove extends along at least a portion of said outer surface of said attachment portion of said first end portion of said flexible boot;
 wherein at least a portion of said first boot retention leg of said additional retaining member is disposed axially outboard from said first end of said flexible boot and said groove in said outer surface of said attachment portion of said first end portion of said flexible boot; and
 wherein at least a portion of said second boot retention leg of said additional retaining member is disposed within said groove in said outer surface of said attachment portion of said first end portion of said flexible boot.

5. The constant velocity joint and flexible boot assembly of claim 4, wherein said attachment portion of said first end portion of said flexible boot has an outer diameter;
 wherein said groove in said outer surface of said attachment portion of said first end portion of said flexible boot has a shoulder portion having an outer diameter; and
 wherein said outer diameter of said shoulder portion of said first end portion of said flexible boot is larger than said outer diameter of said attachment portion of said first end portion of said flexible boot.

6. The constant velocity joint and flexible boot assembly of claim 4, wherein said first boot retention leg of said retaining member has a length that is larger than a length of said second boot retention leg of said additional retaining member.

7. The constant velocity joint and flexible boot assembly of claim 4, wherein said outer surface of said additional retaining member has a retaining member groove circumferentially extending along at least a portion of said outer surface of said additional retaining member.

8. The constant velocity joint and flexible boot assembly of claim 1, further comprising a boot can having a first end portion and a second end portion;
 wherein at least a portion of said first end portion of said boot can is connected to at least a portion of an outer surface of said second end portion of said outer race; and
 wherein at least a portion of said first end portion of said flexible boot is connected to at least a portion of said second end portion of said boot can.

9. The constant velocity joint and flexible boot assembly of claim 8, further comprising an additional retaining member having an inner surface and an outer surface;
 wherein a first and a second boot retention leg extend radially inward from at least a portion of said inner surface of said additional retaining member;
 wherein said first end portion of said flexible boot has an attachment portion that is connected to an outer surface of said second end portion of said boot can;
 wherein a groove extends along at least a portion of said outer surface of said attachment portion of said first end portion of said flexible boot;
 wherein at least a portion of said first boot retention leg of said additional retaining member is disposed axially outboard from said first end of said flexible boot and said groove in said outer surface of said attachment portion of said first end portion of said flexible boot; and
 wherein at least a portion of said second boot retention leg of said additional retaining member is disposed within said groove in said outer surface of said attachment portion of said first end portion of said flexible boot.

10. The constant velocity joint and flexible boot assembly of claim 9, wherein said attachment portion of said first end portion of said flexible boot has an outer diameter;
 wherein said groove in said outer surface of said attachment portion of said first end portion of said flexible boot has a shoulder portion having an outer diameter; and
 wherein said outer diameter of said shoulder portion of said first end portion of said flexible boot is larger than said outer diameter of said attachment portion of said first end portion of said flexible boot.

11. The constant velocity joint and flexible boot assembly of claim 9, wherein said first boot retention leg of said additional retaining member has a length that is larger than a length of said second boot retention leg of said additional retaining member.

12. The constant velocity joint and flexible boot assembly of claim 9, wherein said outer surface of said additional retaining member has a retaining member groove circumferentially extending along at least a portion of said outer surface of said additional retaining member.

13. The constant velocity joint and flexible boot assembly of claim 1, wherein said constant velocity joint further comprises an inner race, a cage and one or more torque transfer elements;
 wherein said inner race has an inner surface and an outer surface; and
 wherein at least a portion of said inner surface of said inner race is drivingly connected to at least a portion of a first end portion of said second shaft.

14. The constant velocity joint and flexible boot assembly of claim 1, wherein said constant velocity joint further comprises a spider with one or more trunnions, an outer roller member and an inner roller member; and
 wherein said spider of said constant velocity joint is connected to said second shaft.

* * * * *